Aug. 11, 1931.    W. G. MYLIUS ET AL    1,818,151
INDUCTION METER DEVICE
Filed April 18, 1930

INVENTORS
Walter G. Mylius and
Bert G. La Bar.
BY
ATTORNEY

Patented Aug. 11, 1931

1,818,151

UNITED STATES PATENT OFFICE

WALTER G. MYLIUS, OF SUMMIT, AND BERT G. LA BAR, OF UNION, NEW JERSEY, ASSIGNORS TO WESTINGHOUSE ELECTRIC AND MANUFACTURING COMPANY, A CORPORATION OF PENNSYLVANIA

INDUCTION METER DEVICE

Application filed April 18, 1930. Serial No. 445,308.

Our invention relates to induction meters or similar devices and particularly to means for supporting and adjusting the damping magnets of watthour meters.

One object of our invention is to provide a damping-magnet structure for a watthour meter, a relay or other instrument, in which the magnet structure shall be adjustable with respect to the rotatable meter-element or disc and be adapted for removal and replacement, relative to the meter or disc, without disturbing its adjustment.

A further object of our invention is to provide an induction-meter device that shall be simple and durable in construction, economical to manufacture and effective in its operation.

In induction-motor-meter devices or relays, it is usual to provide damping magnets that are adjusted in definite relation to the movable elements of the meters. However, as heretofore constructed, it has always, so far as we are aware, been necessary to disturb this adjustment, when the magnet or magnets have been removed from the meter for any cause, and to again adjust the magnet when it is replaced in operative position. This naturally occasions considerable trouble and expense, as well as loss of time in endeavoring that the meter shall operate exactly as it had operated before the removal of the magnet.

In practicing our invention, we mount the damping-magnet structure on an auxiliary support which may be removed from the meter, and on which the magnet is adjustably mounted, so that the adjustment, once effected, shall remain the same, irrespective of removal and replacement of the magnet structure.

Figure 1:
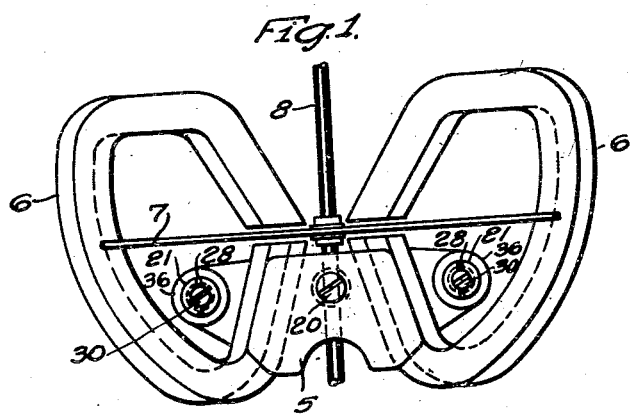

Figure 1, of the accompanying drawings, is a front elevational view of the damping-magnet structure of our invention, showing a portion of a usual meter element for co-operation therewith.

Figure 2:
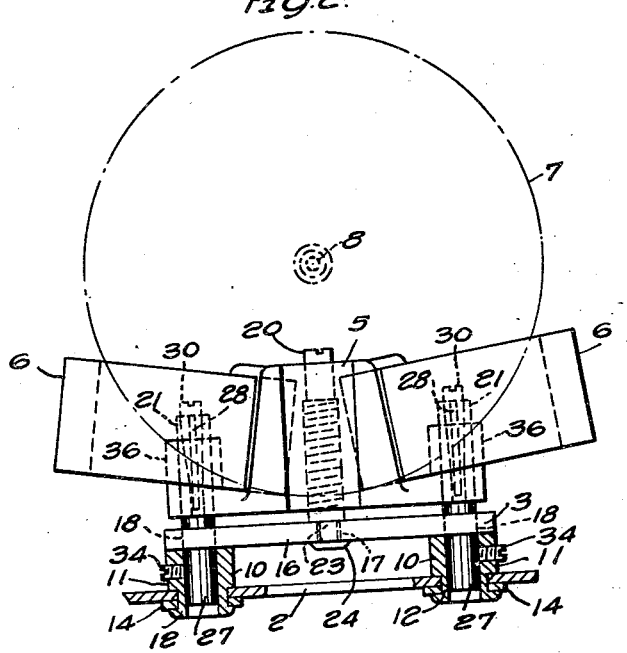
Figure 3:
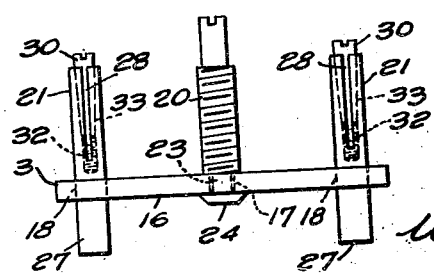

Fig. 2 is a bottom plan view of the device of Fig. 1, but showing, in addition, a portion of the meter frame, and Fig. 3 is a detail plan view of a portion of the structure, as shown in Fig. 2.

The device comprises, in general, a main support or meter frame 2, shown in Fig. 2, an auxiliary support 3, a tertiary support 5, a pair of damping magnets 6, a rotatable-meter element or armature disc 7, and a meter shaft or spindle 8 on which the disc 7 is mounted.

The main support 2, indicated as of sheet metal, constitutes a portion of a usual and well known watthour-meter casing and is provided with apertures for the reception of bushing or sleeve elements 10. The latter are secured to the support 2 through the medium of shoulders 11 thereon and flanges 12 that are swaged outwardly to anchor the sleeves 10 on the support 2. Washers 14 may be provided to add additional thickness to the support 2.

The secondary support 3, comprises a bridge element 16 having a central aperture 17 and end apertures 18 therein for the reception of a screw element 20 and columns 21, respectively. The screw element 20 is provided with a portion 23, of reduced diameter, that is loosely or rotatably mounted in the bridge portion 16 between a head portion 24 and the body of the screw.

The columns 21 are fixedly secured, in any suitable manner, to the bridge element 16, through which they extend, to have inner end portions 27 fitting the sleeves 10 and longitudinally-slotted opposite end portions 28. The latter portions are slotted to render them laterally expansible by cooperation with top-screw elements 30 disposed therein; the screw elements 30 preferably being provided with screw-threaded inner portions 32 of uniform diameter and with smooth-surface tapered portions 33. The sleeves 10 are provided with set screws 34 for securing the portions 27 in position.

The permanent magnets 6, which are of a usual and well-known type, are mounted on the tertiary support 5 in any suitable manner, as by molding portions of the support about the magnets. The support 5 may be of die-cast metal to which the magnets 6 are secured during the casting thereof.

The tertiary support 5 is provided with a central screw threaded opening, for the reception of the screw 20, and with cylindrical bosses 36 for the reception of the columns 21.

By manipulating the screw 20, when the desired adjustment of the magnets relative to the disc 7 has been attained, the screws 30 are advanced into the columns 21 to expand the latter against the bosses 36. This operation permanently fixes the adjustment of the magnets 6 in relation to the bridge element 16.

In the above described structure, when it is necessary or desirable to remove the magnets 6 from the meter, it is only necessary to release the set screws 34, after which the bridge structure 16 and the magnets 6 may be removed from the meter as a unit, without disturbing the adjustment of the magnets.

By our invention, which is extremely simple and compact in construction, only one adjustment of the damping magnets is required, after which the dismantling and reassembling of the meter is readily attained, without any disturbance to the adjustment of the magnets.

While we have shown and described particular forms of our invention, changes may be effected therein without departing from the spirit and scope thereof, as set forth in the appended claims.

We claim as our invention:

1. In an induction-meter device, a magnet structure for co-operation with a movable meter element, a main support, an auxiliary support removably associated with the main support in definite relation thereto and supporting the magnet structure, and means for adjusting the magnet structure relative to said movable element by moving the magnet structure relative to the auxiliary support.

2. In an induction-meter device, the combination with a magnet structure for co-operation with a movable meter element, of means for supporting and adjusting said structure relative to said element providing for removal and replacement of the structure free of disturbance to its adjustment including a main support and a bridge removably associated therewith on which said structure is adjustably mounted.

3. In an induction-meter device, the combination with a magnet structure for co-operation with a movable meter element, of means for supporting and adjusting said structure relative to said element providing for removal and replacement of the structure, free of disturbance to its adjustment, including a main support, a secondary support removably associated with said main support and a tertiary support adjustably mounted in said secondary support.

4. In an induction-meter device, the combination with a magnet structure for co-operation with a movable meter element, of means for supporting and adjusting said structure relative to said element providing for removal and replacement of the structure free of disturbance to its adjustment, including a main support and a secondary support, one of said supports including a socket portion and the other a plug portion fitting the socket portion.

5. In an induction-meter device, the combination with a magnet structure for co-operation with a movable meter element, of means for supporting and adjusting said structure relative to said element providing for removal and replacement of the structure free of disturbance to its adjustment, including a main support and a secondary support, one of said supports including a socket portion and the other a plug portion fitting the socket portion, and a set screw extending laterally through a wall of the socket portion to hold the plug portion in position.

6. In an induction-meter device, the combination with a magnet structure for co-operation with a movable meter element, of means for supporting and adjusting said structure relative to said element providing for removal and replacement of the structure free of disturbance to its adjustment, including a main support, a secondary support removably secured to the main support, a screw member mounted on, and in permanent relatively positioned turnable relation to, said secondary support, and a tertiary support mounted on said screw member for movement relative to the secondary support in response to operation of the screw member.

7. In an induction-meter device, the combination with a magnet structure for co-operation with a movable meter element, of means for supporting and adjusting said structure relative to said element providing for removal and replacement of the structure free of disturbance to its adjustment, including a main support and a secondary support removably secured to the main support and including an expansible column, a tertiary support longitudinally-adjustable on said column, and means for expanding the column to hold the tertiary support in adjusted position.

8. In an induction-meter device, the combination with a magnet structure for co-operation with a movable meter element, of means for supporting and adjusting said structure relative to said element providing for removal and replacement of the structure free of disturbance to its adjustment, including a main support, a secondary support removably secured to the main support and including a longitudinally-split internally screw threaded column, a tertiary support longitudinally adjustable on said column, and a screw for positioning said column and having a tapered portion for expanding the split portion thereof to hold the tertiary support in adjusted position.

In testimony whereof, we have hereunto subscribed our names this 4th day of April, 1930.

WALTER G. MYLIUS.
BERT G. LA BAR.